United States Patent
Griffin et al.

(10) Patent No.: US 11,188,630 B1
(45) Date of Patent: Nov. 30, 2021

(54) DYNAMIC ENROLLMENT USING BIOMETRIC TOKENIZATION

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 48 days.

(21) Appl. No.: 16/706,124

(22) Filed: Dec. 6, 2019

Related U.S. Application Data

(60) Division of application No. 15/481,827, filed on Apr. 7, 2017, now Pat. No. 10,572,641, which is a
(Continued)

(51) Int. Cl.
*G06F 21/32* (2013.01)
*H04L 29/06* (2006.01)
(Continued)

(52) U.S. Cl.
CPC .......... *G06F 21/32* (2013.01); *H04L 63/0861* (2013.01); *G06F 21/44* (2013.01);
(Continued)

(58) Field of Classification Search
None
See application file for complete search history.

(56) References Cited

U.S. PATENT DOCUMENTS

| 7,941,668 B2 | 5/2011 | Stapleton et al. |
| 8,289,135 B2 | 10/2012 | Griffin |

(Continued)

OTHER PUBLICATIONS

American National Standard for Financial Services, "ANSI X9.119-2016, Retail Financial Services, Requirements for Protection of Sensitive Payment Card Data, Part 2: Implementing Post-Authorization Tokenization Systems", 2016. 67 pages.
(Continued)

*Primary Examiner* — Benjamin E Lanier
(74) *Attorney, Agent, or Firm* — Foley & Lardner LLP

(57) ABSTRACT

Various embodiments relate to a dynamic biometric enrollment system. The dynamic biometric enrollment includes a processor and instructions stored in non-transitory machine-readable media. The instructions are configured to cause the server system to receive at least one biometric authentication sample from the user. The at least one tokenized biometric enrollment sample has been generated by tokenizing at least one biometric enrollment sample captured from a user associated with a unique user identifier. At least one biometric authentication sample captured from the user is retrieved. The at least one tokenized biometric enrollment sample is detokenized to retrieve the at least one biometric enrollment sample. The at least one biometric enrollment sample is processed using a biometric processing algorithm to generate a dynamic biometric reference template. It is determined whether the at least one biometric authentication sample matches with the dynamic biometric reference template.

20 Claims, 3 Drawing Sheets

Related U.S. Application Data continuation-in-part of application No. 15/188,685, filed on Jun. 21, 2016, now Pat. No. 10,142,333.

(51) Int. Cl.
    *G06F 21/45*    (2013.01)
    *H04L 9/32*     (2006.01)
    *G06F 21/44*    (2013.01)

(52) U.S. Cl.
    CPC ............ *G06F 21/45* (2013.01); *H04L 9/3231* (2013.01); *H04L 2463/082* (2013.01)

(56) References Cited

U.S. PATENT DOCUMENTS

| | | | |
|---|---|---|---|
| 8,301,902 | B2 | 10/2012 | Griffin |
| 8,327,134 | B2 | 12/2012 | Griffin |
| 8,359,475 | B2 | 1/2013 | Griffin |
| 8,508,339 | B2 | 8/2013 | Griffin |
| 8,700,909 | B2 | 4/2014 | Griffin |
| 8,756,416 | B2 | 6/2014 | Griffin |
| 8,782,397 | B2 | 7/2014 | Arnold et al. |
| 10,142,333 | B1 | 11/2018 | Griffin et al. |
| 2004/0010697 | A1 | 1/2004 | White |
| 2005/0229007 | A1 | 10/2005 | Bolle et al. |
| 2006/0239511 | A1 | 10/2006 | White et al. |
| 2007/0283165 | A1 | 12/2007 | Milgramm et al. |
| 2009/0116703 | A1* | 5/2009 | Schultz .................. G06F 21/32 382/118 |
| 2009/0164796 | A1 | 6/2009 | Peirce |
| 2010/0205431 | A1 | 8/2010 | Griffin |
| 2011/0126280 | A1* | 5/2011 | Asano .................... G06F 21/32 726/19 |
| 2011/0138187 | A1 | 6/2011 | Kaga et al. |
| 2012/0167183 | A1 | 6/2012 | Langley |
| 2014/0149747 | A1 | 5/2014 | Bowers |
| 2015/0082390 | A1* | 3/2015 | Flink .................. H04W 12/068 726/4 |
| 2016/0203496 | A1 | 7/2016 | Guerrero et al. |
| 2016/0300234 | A1 | 10/2016 | Moss-Pultz et al. |
| 2016/0323273 | A1 | 11/2016 | Aufderheide, Jr. et al. |
| 2016/0330027 | A1 | 11/2016 | Ebrahimi |

OTHER PUBLICATIONS

American National Standard for Financial Services, "Biometric Information Management and Security for Financial Services Industry", ANSI X9.84-2010, Mar. 31, 2010. 172 pages.

American National Standard for Financial Services, "Cryptographic Message Syntax ASN.1 and XML", ANSI X9.73-2010, Apr. 15, 2010. 89 pages.

Griffin, Phillip H., "Telebiometric Authentication Objects", Complex Adaptive Systems, Publication 4, Procedia Computer Science, 36, pp. 393-400, 2014. 8 pages.

International Telecommunication Union, "Series X: Data Networks, Open Security Communications and Security, OSI networking and system aspect—Naming, Addressing and Registration", X.660, Jul. 2011. 32 pages.

\* cited by examiner

DYNAMIC ENROLLMENT USING BIOMETRIC TOKENIZATION

CROSS-REFERENCE TO RELATED APPLICATION

This application is a divisional of U.S. patent application Ser. No. 15/481,827, filed Apr. 7, 2017, which is a continuation-in-part of U.S. patent application Ser. No. 15/188,685, filed Jun. 21, 2016, all which are hereby incorporated by reference in their entirety.

BACKGROUND

Biometric technology is used to confirm the identity of an individual in order to provide secure access to electronic systems (e.g., to perform financial transactions). After an individual enrolls in a biometric service (e.g., provides biometric data and a non-biometric means of confirming an identity), the individual can be authenticated via the biometric service. Biometric authentication (e.g., identification and verification) leverages the universally recognized fact that certain physiological or behavioral characteristics can reliably distinguish one person from another. Biometric technology includes both automatically collecting and comparing these characteristics. Digital representations of these characteristics are stored in an electronic medium and later used to authenticate the identity of an individual.

SUMMARY

Various embodiments relate to a method of automatic biometric re-enrollment. An example method includes retrieving at least one tokenized biometric enrollment sample associated with a user identifier. The at least one tokenized biometric enrollment sample was generated by tokenizing at least one biometric enrollment sample captured from a user associated with the user identifier. A first biometric reference template associated with the user identifier is retrieved. The first biometric reference template has been generated by processing the at least one biometric enrollment sample using a first biometric processing algorithm. The user in the biometric authentication computing system is re-enrolled using a second biometric processing algorithm. Re-enrolling the user includes detokenizing the at least one tokenized biometric enrollment sample to retrieve the at least one biometric enrollment sample. The at least one biometric enrollment sample is verified against the first biometric reference template. A re-enrollment match value is generated that is indicative of whether the at least one biometric enrollment sample is verified. The at least one biometric enrollment sample is processed using the second biometric processing algorithm to generate a second biometric reference template. The second biometric reference template is associated with the user identifier. The second biometric reference template is generated automatically by the biometric authentication computing system without requiring additional input from the user.

Various other embodiments relate to a dynamic biometric enrollment system. The dynamic biometric enrollment includes a processor and instructions stored in non-transitory machine-readable media. The instructions are configured to cause the server system to receive at least one biometric authentication sample from the user. The at least one tokenized biometric enrollment sample has been generated by tokenizing at least one biometric enrollment sample captured from a user associated with a unique user identifier. At least one biometric authentication sample captured from the user is retrieved. The at least one tokenized biometric enrollment sample is detokenized to retrieve the at least one biometric enrollment sample. The at least one biometric enrollment sample is processed using a biometric processing algorithm to generate a dynamic biometric reference template. It is determined whether the at least one biometric authentication sample matches with the dynamic biometric reference template.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
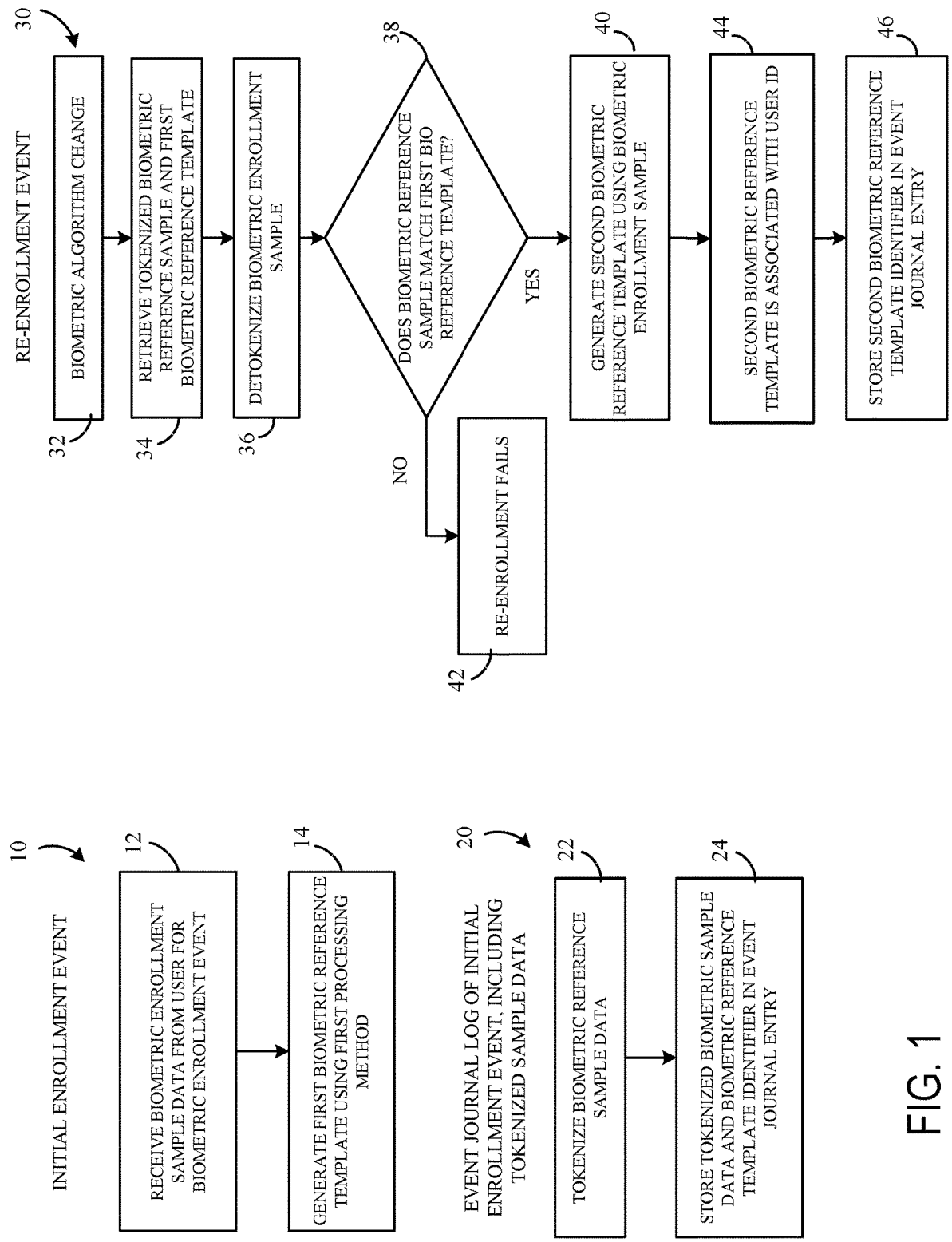
FIG. 1 is a flow diagram of a method of re-enrolling a biometric template database using a new processing algorithm, according to an example embodiment.

Biometrics can be used for human identification and authentication for both physical and logical access (e.g., access to applications, services, or entitlements, etc.). Authentication systems require that the party who wishes to be authenticated has enrolled a biometric reference template with a biometric service provider ("BSP") or similar entity. A biometric reference template is a digital reference of distinct characteristics of an individual obtained by processing one or more biometric samples from the individual. Subsequent to enrollment, biometric reference templates are used during biometric authentication processes. Biometric authentication processes include verification and/or identification. Verification is the process of comparing a match template against a specific reference template based on a claimed identity (e.g., user ID, account number, etc.). Verification is a "one-to-one" comparison that entails comparing a match template generated from a newly captured sample to a previously generated reference template stored in a database or on an ID card. Identification is the process of comparing a submitted biometric sample against some or all enrolled biometric reference templates to determine an individual's identity. Identification is a "one-to-many" comparison that entails comparing a match template generated from a newly captured sample to all of the templates in the database. Identification is most often used to determine whether or not an individual has previously enrolled in the system.

Current security techniques for protecting biometric data confidentiality in biometric reference templates have utilized encryption for securely transferring biometrics. Protection by encryption may be performed by a BSP that manages a store of biometric templates. Issues arise when an attacker, including an insider attacker, gains access to the BSP's store of biometric reference templates, and therefore an individual user's biometric data. To protect the confidentiality of personally identifiable biometric data, symmetric key encryption is currently the preferred method of encrypting biometric data (e.g., as set forth in ISO 19092 and X9.84 biometric information security and management standards for financial services).

In current biometric systems, re-enrollment of a user population by a BSP is problematic for any size user population. When the user population of a BSP is small, requesting that each user re-enroll is disruptive and time consuming. Additionally, as biometrics become more prevalent in everyday activities (e.g., mobile device payments, multi-factor authentication, etc.), it is cumbersome to enroll biometric samples for each vendor or entity using biometrics in their respective technologies. When the user population is large (e.g., hundreds, thousands, or millions of users), the problems associated with a small population are exacerbated such that re-enrollment is only feasible using an automated approach that reuses the original biometric enrollment samples to generate newer biometric reference templates. To accomplish this large re-enrollment, the original biometric enrollment samples must be securely stored for long periods of time. Accordingly, such a repository of biometric data is a target of attackers, and the enrollment process is prone to mistakes made in the generation of the new biometric reference templates. Such mistakes include misusing or mistaking one set of original biometric enrollment samples for another. This issue could result in subsequent re-enrollment instances using an incorrect biometric enrollment sample. In other words, if the automatic re-enrollment process has a programming glitch that skips or repeats an occasional conversion, a large percentage of the newer biometric reference templates may be stored in the wrong profiles. The operational impact of such a mistake would be disastrous and unacceptable as none of the biometric data could reasonably be verified without user participation (e.g., resubmission of biometric enrollment samples).

Various embodiments herein relate to systems and methods for automatically re-enrolling and dynamically enrolling biometric information. Specifically, a dynamic biometric enrollment system is used to perform verifiable re-enrollment of a user population and dynamic initial enrollment of one or more users. The dynamic biometric enrollment system facilitates the tokenization of one or a plurality of biometric enrollment samples used during enrollment, performs a trusted vetting of the biometric enroller's identity during a re-enrollment process, and logs the results in an event journal as part of the normal biometric event (e.g., successful vetted re-enrollment). The event journal is a repository that can be reviewed at any time to determine if the biometric event logs (re-enrollment, dynamic enrollment, verification, etc.) are complete and accurate. Tokenization is a form of obfuscating the cleartext such that it is replaced with a pseudonym data element in the form of a token. Generally, the tokenization and detokenization of data is processed by a tokenization service provider ("TSP"). Subsequently, these tokenized biometric samples may be used to facilitate an automatic re-enrollment or to dynamically produce a biometric reference template.

Generally, a dynamic biometric enrollment system enables biometric processing techniques to change over time without requiring users to re-enroll in the service by providing new biometric samples. Typically, once biometric data has been processed (e.g., to generate a biometric reference template), it is not possible to reconstruct the raw biometric data from the processed sample or template. Accordingly, various arrangements overcome this limitation by tokenizing the raw biometric data so that the data may be securely stored and reprocessed in accordance with new or otherwise different biometric processing techniques. These techniques may be used to re-enroll users using a new processing algorithm or for an entity to generate—in real time—a biometric reference template to verify an unknown user providing a fresh biometric sample. Accordingly, embodiments herein solve technical problems related to implementing new biometric processing techniques without requiring users to submit new biometric samples during re-enrollment or requiring users to enroll biometric samples with a plurality of entities.

Expanding generally on initial enrollment, a BSP captures one or more biometric data samples (e.g., fingerprint, voiceprint, iris image, hand geometry, keystroke patterns, dynamic signatures) (typically two or more samples) from a user via a biometric sensor. The BSP is tasked with verifying and vetting the user's identity during initial enrollment. In some instances, this includes vetting the user identity against collateral material such as photo identification, government-issued identification, birth certificates, and the like. Once the identity is verified, each sample is tokenized, providing security to the underlying biometric data while at rest and transit, and associated with a user identifier unique to the enrolled user. The biometric enrollment tokens (the tokenized biometric enrollment samples) are logged as part of the biometric enrollment event log in the event journal. The biometric enrollment tokens allow for re-enrollment because they can be detokenized and processed using the new processing algorithm to generate a new biometric reference template. These biometric enrollment tokens, along with a generated biometric reference template, can be subsequently used to verify the validity of the re-enrollment event and protect against automatic re-enrollment errors.

Expanding generally on the dynamic enrollment in the dynamic biometric enrollment system, an unknown user (e.g., challenger) provides a claimed identity and a fresh biometric sample to a third party. The claimed identity is used to locate the user profile containing the biometric enrollment token(s) in the dynamic biometric enrollment system associated with the claimed identity. The biometric enrollment tokens are retrieved and transmitted to the third party where they are detokenized and processed using the third party's processing methods to generate a dynamic biometric reference template for the third party to use to authenticate the user. The dynamic biometric reference template is matched with the fresh biometric sample to verify the unknown user as the claimed identity. The third party and/or the dynamic biometric enrollment system can tokenize the fresh biometric sample and the biometric verification event and log the verification event as part of the success or failure biometric authentication event log in an event journal. As will be appreciated, the dynamic biometric enrollment system allows a third party to use any biometric-based system using proprietary algorithms and matching technology.

The event journal can be reviewed at any time to determine if the biometric event logs are complete and accurate. The event journal comprises event logs that include a biometric token and a biometric reference template identifier. The biometric token protects the underlying biometric data through tokenization and can be detokenized and re-verified using the biometric reference template associated with the biometric reference template identifier in the event journal entry. In some arrangements, a biometric template token is included in the event logs in lieu of a biometric reference template identifier. For a biometric re-enrollment event, the logged biometric enrollment tokens are detokenized, the associated biometric reference template token is detokenized or retrieved, and the biometric enrollment sample is verified (e.g., matched) against the biometric reference template. Previously successful logged authentication events should re-succeed and result in a newly generated biometric reference template. Conversely, previously failed logged authentication events should re-fail.

The event journal can also be reviewed as part of a dispute resolution or fraud investigation. For example, if a user disputes an action involving one or more biometric samples and/or biometric enrollment, then the event journal can provide evidence as to whether the biometric re-enrollment was successful. The relevant biometric events in the event journal can be used to detokenize the logged token to verify the biometric re-enrollment event(s). As will be appreciated, the TSP is the only source capable of detokenizing the biometric tokens to recover the biometric enrollment samples, biometric reference template, or any biometric authentication samples. Further, the BSP (or similar entity) performs the initial biometric enrollment. Alternatively, in some embodiments, the BSP is fully contained within the TSP such that no biometric data is ever stored outside the controlled environment of the TSP.

These embodiments abrogate the issues in the current biometric security and storage ecosystems because using the specific tokenization techniques and schema protects biometric data during transfer and while at rest. Additionally, the dynamic biometric enrollment system allows for the subsequent audit and compliance checks of the various activities (e.g., re-enrollment and dynamic enrollment) involving the biometric information. The dynamic biometric enrollment system, according to various embodiments, provides a more effective and efficient way to securely transport and audit biometric information than the current industry practices of storing raw biometric information as cleartext within logs, templates, transmissions, etc., that are transmitted over the internet. The secure transport and protection of the biometric data is in accordance with industry standards and allows users of the dynamic biometric enrollment system to restrict access to sensitive biometric data to those with a need-to-know. The biometric reference templates, biometric enrollment samples, and biometric verification samples can be securely stored, transferred, distributed, or used without loss of confidentiality.

Under the current systems, raw biometric information is usually not stored because of the risk of unauthorized access of the sensitive information. However, this practice eliminates the ability to audit or validate compliance of biometric enrollment or authentication events. In some instances—and in order to provide subsequent compliance and auditing—the biometric information is stored via encryption. However, encryption requires implementing cryptographic algorithms and managing cryptographic keys when logging the sensitive biometric data. Because logs are often created in one location, distributed, collected, and processed in other locations, managing keys is problematic, especially in asymmetric key encryption algorithms that require two distinct keys (one for each of encryption and decryption). The dynamic biometric enrollment system overcomes these cumbersome and process intensive key management limitations by securely storing users' biometric samples and providing verifiable re-enrollment of one or more users in a BSP's population. Embodiments described herein utilize a less strenuous processing method through a specific tokenization system and do not have the overhead of meeting and maintaining key management requirements as required in current authentication systems. Processing power is alleviated by the use of globally-unique information object identifiers ("OIDs") and signed attributes to identify the processing algorithm used for the biometric data. For example, in some embodiments, a biometric reference template may be used to process two biometric data types using two different algorithms that are easily discernable through the OIDs. Additionally, the dynamic biometric enrollment system reduces the amount of time required to identify and reprocess biometric information stored in a biometric reference template. Accordingly, the dynamic biometric enrollment system can be applied to any industry using biometric authentication, as the dynamic biometric enrollment system allows for any processing algorithms, matching algorithms, and biometric technology to be used. The dynamic biometric enrollment system allows for real-time generation of reference templates using biometrics and any processing or matching algorithms while maintaining the security posture of the system to ensure that the biometric data is safe from man-in-the-middle attacks and data breaches.

In addition, the methods and systems described herein improve biometric processing systems by enabling biometric processing techniques to be audited and verified at a later time. Typically, once biometric data has been processed (e.g., to generate a biometric reference template), it is not possible to reconstruct the raw biometric data from the processed sample or template. Various embodiments include tokenizing the raw biometric data so that the data may be securely accessed and audited in accordance with the regulations, standards, or best practices of a BSP.

FIG. 1 is a flow diagram of a method 30 of re-enrolling a biometric reference template, according to an example embodiment. The re-enrollment method 30 is shown in connection with a BSP performing an automated re-enrollment of one or more biometric profiles in the BSP's database. As shown in FIG. 1, prior to re-enrollment, the dynamic biometric enrollment system performs an initial enrollment method 10 and a method 20 of generating an initial enrollment event journal entry. As will be appreciated, the re-enrollment method 30 could be performed by a BSP that manages a BSP computing system (such as BSP computing system 102 of FIG. 2) or an external third party (such as an entity that manages a third party computing system 110 of FIG. 2). Additionally, the method 30 may be similarly performed by other systems and devices.

Generally, the automatic re-enrollment method 30 allows for automatic and verified re-enrollment of biometric enrollment samples from one processing algorithm to another processing algorithm (e.g., when a BSP changes biometric algorithms). The automatic verification of the user's original biometric enrollment sample(s) is accomplished using the biometric enrollment tokens (i.e., the tokenized biometric enrollment samples) previously logged—or stored—during the initial enrollment 10 and a previously generated biometric reference template (generated using the biometric data in the biometric enrollment token and the old processing algorithm). The biometric enrollment tokens are detokenized, and a previously generated biometric reference template is retrieved. The detokenized biometric enrollment sample is compared to the previously generated biometric reference template, either by matching each biometric enrollment sample with the biometric reference token or by recreating the biometric reference template. In either method, once the original biometric enrollment samples have been verified using the existing biometric reference token, a new biometric reference template can then be generated. The automatic re-enrollment is captured in the event journal along with the biometric enrollment tokens, the old biometric reference template, and the new biometric reference template. Only the biometric tokens or identifiers are included in the event log; no biometric data (e.g., samples, reference templates, etc.) is captured in the event log.

The initial enrollment method 10 begins at 12 when the BSP receives a biometric enrollment sample and a user identifier. The user identifier is associated with the user who is enrolling in the BSP's services. The enrollment process may include checking the identification credentials (e.g., state issued driver's license, birth certificate, etc.) of the user to confirm the user's identity. The biometric enrollment sample may include one or more samples from any of a plurality of biometric technologies (e.g., iris, voice, fingerprint, etc.). As will be appreciated, multiple raw biometric data samples may be captured during initial enrollment, allowing for future processing using any processing algorithm.

At 14, the BSP processes the provided biometric enrollment sample using a first processing algorithm to generate a first biometric reference template. In some arrangements, the BSP may facilitate the tokenization of the first biometric reference template. In some arrangements, a trusted timestamp token ("TST") may be retrieved from a Time Stamping Authority ("TSA") and associated with the provided biometric enrollment sample. The TST provides a reliable and verifiable time indicative of when the sample was taken.

The method 20 of generating an enrollment event journal entry begins at 22 when the BSP tokenizes the biometric enrollment sample data. This may include transferring the data to a TSP with a tokenization request. The TSP tokenizes the biometric data and transmits the tokenized biometric data to the BSP. By tokenizing the biometric enrollment samples, an additional layer of security to the underlying biometric information and an inherent integrity mechanism are created.

At 24, the BSP generates an initial enrollment event entry including the tokenized biometric enrollment data (e.g., biometric enrollment token) and a biometric reference template identifier and stores the enrollment event entry in a repository (e.g., database, blockchain, distributed ledger, etc.). In some arrangements, a biometric template token (e.g., tokenized biometric reference template) is included in the event log in lieu the biometric reference template identifier. In some embodiments, the BSP digitally signs (e.g., cryptographically binds) the enrollment event journal entry containing the tokenized biometric data and biometric reference template identifier. In other embodiments, the BSP digitally signs the tokenized biometric data and biometric reference template identifier and additional identifiers to generate the enrollment event journal entry. In some arrangements, the digital signing is performed using SignedData cryptographic message syntax to generate a SignedData message, binding additional identifiers (e.g., OIDs) and other information to the enrollment event journal entry to create a signed message. Some embodiments utilize an OID as specified in the ISO/IEC 9834-1 standard. In some embodiments, the SignedData is the cryptographic message defined in the X9.73 financial industry security standard. After performing the SignedData signature verification, an auditing entity can verify the tokenized biometric data and biometric reference template identifier contained within the entry. The information needed for token processing can be contained in an attribute of the SignedData message that may be cryptographically bound to the enrollment event journal entry being signed under the same digital signature.

The method 30 of automatic re-enrollment begins at 32 with a change to the processing algorithm or biometric technology of the BSP. This change can include a transition to a new biometric technology for generating the biometric reference templates. For example, the BSP captured biometric enrollment data related to a user's iris and fingerprint but only used the fingerprint to generate the first biometric reference template. Subsequently, the BSP wants to use iris scans as the base biometric in the BSP's biometric reference templates and authentication events—perhaps due to superior iris scan technology—and needs to automatically re-enroll all users to generate new biometric reference templates using the previously captured iris data. Alternatively, the change could be related to a new processing algorithm used to generate the biometric reference templates using existing biometric enrollment samples. For example, the BSP may develop or acquire a processing algorithm that is superior (e.g., more accurate in matching, faster processing speed, etc.) to the one used during the initial enrollment method 10. As will be appreciated, the method 30 of re-enrolling an individual using the initial biometric enrollment samples may be repeated for a plurality of individuals using each individual's respective biometric samples.

At 34, the biometric enrollment tokens and the first biometric reference template (e.g., either tokenized or as an identifier) are retrieved. In arrangements where the first biometric reference template identifier is included, the identified first biometric reference template is retrieved from the reference template database or repository. In some arrangements, the initial enrollment event journal entry is retrieved and then the biometric enrollment tokens and the first biometric reference template are retrieved from the entry. In those arrangements, the retrieval includes accessing the initial enrollment event journal entry in an event journal or repository. In some arrangements, the retrieval includes verifying the digital signature of the digitally signed enrollment event journal entry.

At 36, the biometric enrollment token is detokenized. This may include transferring the data to a TSP with a detokenization request. In those arrangements, the TSP detokenizes the biometric data and transmits the plaintext biometric data to the BSP. In arrangements where the biometric reference template is included the enrollment event, the stored biometric reference template is also detokenized.

At 38, it is determined whether the biometric enrollment sample matches the first biometric reference template. In some embodiments, this process includes using the biometric enrollment sample to generate (using the same processing techniques) a temporary biometric reference template to match with the first biometric reference template using the first processing algorithm at 14. If the biometric enrollment sample matches the biometric reference template, then the automatic re-enrollment process may continue at 40. If the biometric enrollment sample does not match the biometric reference template, the re-enrollment process fails at 42.

Expanding on the matching process at 38, a variety of different matching methods can be implemented to validate the automated process and ensure that the correct individual's biometric samples are used to generate that individual's new biometric reference template. For example, as discussed above, the first processing algorithm is used on the enrollment token to generate a temporary biometric reference template that is compared to the first biometric reference template previously generated at 14. If the temporary biometric reference template is similar to the first biometric reference template, then the biometric samples are correct and re-enrollment may continue. A second arrangement includes using the biometric enrollment samples and a biometric verification process to compare the samples against the first biometric reference template. If the biometric samples are verified against the first biometric reference template, then the biometric samples are correct and re-enrollment may continue.

The failed re-enrollment at 42 can trigger the generation of a re-enrollment event journal entry to be stored in the event journal or similar repository. The re-enrollment event journal entry includes an identifier signifying the biometric enrollment event journal entry and the failed re-enrollment data. In some arrangements, the re-enrollment event journal entry may be digitally signed by the entity conducting the audit event. In some arrangements, the digital signing is performed using SignedData cryptographic message syntax to generate a SignedData message, binding additional identifiers (e.g., OIDs) and other information to the re-enrollment event journal entry to create a signed message.

At 40, the second biometric reference template is generated using the individual's initial biometric sample. This may include, for example, using a different biometric technology to generate the second biometric reference template or using a second processing algorithm on the biometric enrollment sample to generate the second biometric reference template. For example, generating a new biometric reference template using a new biometric technology (e.g., biometric type) involves comparing an individual's biometric sample associated with the first biometric technology (e.g., iris) to the biometric reference template generated using that biometric technology. If they match, another biometric technology (e.g., fingerprint) captured during the individual's initial enrollment is used to generate the new (e.g., second) biometric reference template.

As will be appreciated, the second biometric reference template may include multiple biometric enrollment samples in one reference template, with each biometric enrollment sample having a unique identifier indicating they type or origination of the biometric enrollment sample. For example, the second biometric reference template may include both a first biometric sample captured using a first biometric technology—and associated identifier—and a second biometric sample captured using a second biometric technology—and associated identifier. In some arrangements, a TST may be retrieved from a TSA and associated with the second biometric reference template to generate a trusted biometric reference template ("TBRT"). The TBRT provides a reliable and verifiable time when the second template was generated or tokenized.

At 44, the second biometric reference template generated at 40 is associated with the user identifier that uniquely identifies the user being re-enrolled. In some arrangements, the association of second biometric reference template and the user identifier may trigger the deletion or removal of the first biometric reference template by the BSP. In some arrangements, if the second biometric reference template uses a biometric technology that differs from the first biometric reference template, both the first and second reference template may be active and associated with the user identifier in order to complete authentication events with each template's respective biometric technology.

At 46, a re-enrollment event journal entry is generated in response to the second biometric reference template being generated. The re-enrollment event journal entry can include one or more of: the tokenized biometric enrollment data, a second biometric reference template identifier, and the first biometric reference template. The re-enrollment event journal entry is stored in a repository (e.g., database, blockchain, distributed ledger, etc.). In some arrangements, a biometric template token (e.g., tokenized biometric reference template) is included in the event log in lieu of the biometric reference template identifier. In some embodiments, the BSP digitally signs (e.g., cryptographically binds) the re-enrollment event journal entry containing the tokenized biometric enrollment data, second biometric reference template identifier, and first biometric reference template identifier. In other embodiments, the BSP digitally signs the tokenized biometric enrollment data, second biometric reference template identifier, first biometric reference template identifier, and additional identifiers to generate the re-enrollment event journal entry. In some arrangements, the digital signing is performed using SignedData cryptographic message syntax to generate a SignedData message, binding additional identifiers (e.g., OIDs) and other information to the verification event journal entry to create a signed message. Some embodiments utilize an OID as specified in the ISO/IEC 9834-1 standard. In some embodiments, the SignedData is the cryptographic message defined in the X9.73 financial industry security standard. After performing the SignedData signature verification, an auditing entity can verify the tokenized biometric enrollment data, second biometric reference template identifier, and first biometric reference template identifier contained within the entry. The information needed for token processing can be contained in an attribute of the SignedData message that may be cryptographically bound to the verification event journal entry being signed under the same digital signature.

Figure 2:
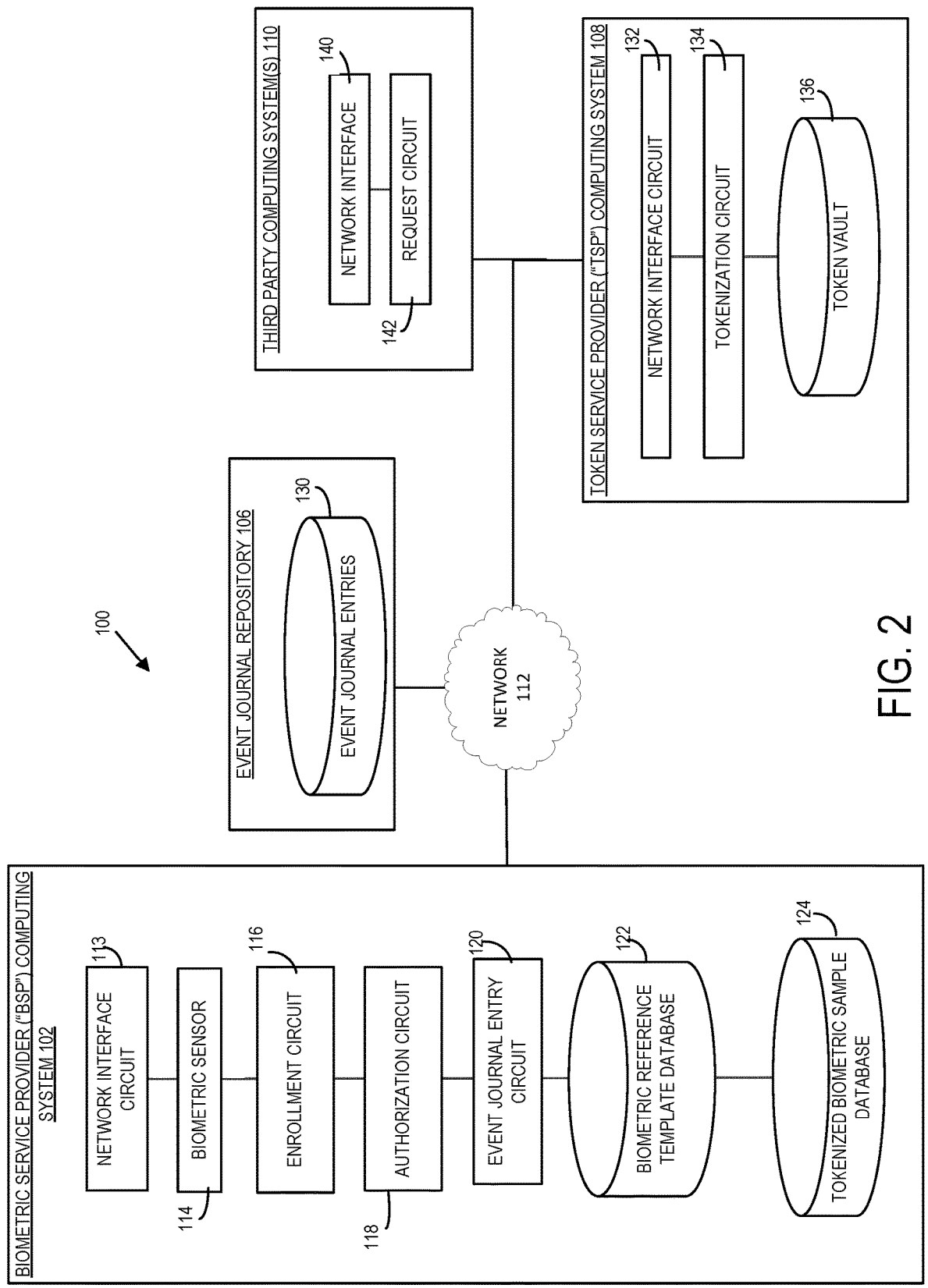
FIG. 2 is a schematic diagram of a dynamic biometric enrollment system, according to an example embodiment.

FIG. 2 is a schematic diagram of a dynamic biometric enrollment system 100, according to an example embodiment. The dynamic biometric enrollment system 100 includes a BSP computing system 102, an event journal repository 106, a TSP computing system 108, and one or more third party computing systems 110. Each of the BSP computing system 102, the event journal repository 106, the TSP computing system 108, and the third party computing system 110 is in operative communication with the others via a network 112. The network 112 may include, for example, the Internet, cellular networks, proprietary banking networks, and the like.

Generally, the dynamic biometric enrollment system 100 is used to perform verifiable automatic re-enrollment or to perform a dynamic initial enrollment. The dynamic biometric enrollment system 100 can generate event journal entries 130 in response to a biometric event (e.g., enrollment, re-enrollment, dynamic enrollment event, etc.), securely store biometric information, and facilitate the subsequent re-enrollment or dynamic enrollment using one or more event journal entries 130 in the event journal repository 106. The dynamic biometric enrollment system 100 may be used to implement the automatic re-enrollment method 30 of FIG. 1 as discussed above or the dynamic enrollment method 320 discussed below in reference to FIG. 3. Although various embodiments are described in connection to users of biometric systems, it should be understood that the systems and methods described herein may similarly be used to provide biometric authentication in any type of system, such as enterprise security and other types of systems. While the TSP computing system 108 and the BSP computing system 102 are shown as separate entities in FIG. 2, in some embodiments the BSP computing system 102 performs some of or all of the functions of the TSP computing system 108 as described herein. In some embodiments, one or both of the BSP computing system 102 and the TSP computing system 108 are managed and operated by a financial institution. However, in other embodiments, one or both of the BSP computing system 102 and the TSP computing system 108 are managed and operated by a third-party that is external to a financial institution.

The BSP computing system 102 includes a network interface circuit 113, a biometric sensor 114, an enrollment circuit 116, an authorization circuit 118, an event journal entry circuit 120, a biometric reference template database 122, and a tokenized biometric sample database 124. The BSP computing system 102 may, for example, include one or more servers each with one or more processors configured to execute instructions stored in a memory, send and receive data stored in the memory, and perform other operations to implement the financial services described herein. In some arrangements, the tokenized biometric samples may be stored in the BSP computing system 102. The network interface circuit 113 is structured to facilitate operative communication between the BSP computing system 102 and other systems and devices over the network 112.

The biometric sensor 114 is structured to capture a biometric sample from an individual and to process the biometric sample to generate the biometric data. The biometric sample can be for enrollment or a subsequent authentication event. The biometric data may be referred to as "raw" biometric data. For example, the sensor 114 can be of any biometric technology structured to read a fingerprint, voice print, or other biometric marker. Generally, the biometric sensor 114 is any device that supports the capture of biometric data. In some embodiments, the request is initiated by an employee of the BSP entering data into a computing system (e.g., an employee terminal connected to the server of the BSP) during a person-to-person interaction. For example, the user (e.g., the customer) may walk into a branch location of the BSP and initiate an enrollment request, a biometric reference template update, or a service requiring biometric authentication.

In some arrangements, the biometric sample captured from the individual is received by the BSP computing system 102. In those arrangements, the received biometric sample may also include a plurality of source identifiers. The plurality of source identifiers can include a device identifier uniquely identifying the device used to capture the at least one biometric sample, a location at which the biometric sample was captured, a device MAC address, or the like. The source identifiers can be validated during the audit process.

The enrollment circuit 116 is structured to securely store the initial enrollment samples, generate and associate a user's biometric reference template with a user identifier, and facilitate the automated re-enrollment. Generally, the enrollment circuit 116 is structured to facilitate enrollment, the process through which the user's identity is bound with biometric data, and entered into the system database 122— either as a biometric reference template or as tokenized biometric enrollment data. In generating a biometric reference template, the enrollment circuit 116 first receives a biometric enrollment sample and a user identifier. In some arrangements, a plurality of biometric enrollment samples are captured using a plurality of biometric technologies. In those arrangements, the plurality of raw biometric enrollment samples allows the dynamic biometric enrollment system 100 to service a bigger pool of third party biometric reference template generation as more biometric technologies are supported. The enrollment circuit 116 processes the biometric enrollment sample to generate the biometric data using a processing algorithm. After the biometric enrollment data is processed to generate the biometric reference template, the raw biometric enrollment sample is tokenized and stored in the tokenized biometric sample database 124. The biometric data is used to generate the biometric reference template. The biometric reference template includes a template identifier uniquely identifying the biometric reference template, the tokenized biometric data, and a first identifier signifying that the biometric reference template includes tokenized biometric data. The template identifier is associated with the user identifier and used to locate the biometric reference template in the database 122.

In arrangements in which the biometric reference template is tokenized, the enrollment circuit 116 transmits the biometric data to the TSP computing system 108 to be tokenized. The enrollment circuit 116 receives a tokenized biometric data string from the TSP computing system 108. In some arrangements, digital signing is performed on a hash of the biometric reference template, allowing the biometric reference template to be authenticated with the hash while minimizing processing issues.

The enrollment circuit 116 also facilitates the automated re-enrollment process described in greater detail above in method 30 of FIG. 1. In some arrangements, the enrollment circuit 116 also facilitates dynamic enrollment. Generally, this occurs when the BSP computing system 102 wants to generate a biometric reference template of a certain biometric technology for which an individual already has a tokenized biometric sample in the tokenized biometric sample database 124 of the BSP computing system 102 of FIG. 2. This process is explained in greater detail below in reference to method 320 of FIG. 3.

The authorization circuit 118 facilitates the use of the tokenized biometric enrollment samples in the tokenized biometric sample database 124 by the BSP computing system 102 and other systems and devices over the network 112. The authorization circuit 118 ensures that an entity requesting the tokenized biometric enrollment samples for re-enrollment or dynamic enrollment is authorized. In a re-enrollment request, the authorized entity would be the BSP that performed the initial enrollment using the tokenized biometric enrollment samples. In a dynamic enrollment request, an authorized entity would be one that possesses the user identifier of a user that has biometrics stored in the tokenized biometric enrollment samples (e.g., the user arrives at the entity location, is required to provide a biometric, and provides information for retrieving the user's tokenized biometric enrollment sample). In some arrangements, the third party computing system 110 is a subscriber to the dynamic biometric enrollment system 100, thereby allowing the third party computing system 110 to retrieve a tokenized biometric enrollment sample from the database 124 by providing a user identifier because the third party has been previously vetted.

The event journal entry circuit 120 facilitates the generation of the event journal entries 130 in the event journal repository 106. The event journal entry circuit 120 is in communication with the enrollment circuit 116 to generate enrollment and re-enrollment event journal entries 130. In some arrangements, the event journal entry circuit 120 also facilitates the generation of the audit event journal entries 130 of enrollment, re-enrollment, and dynamic enrollment event journal entries 130. The event journal entries 130 are associated with a biometric reference template and may relate to events regarding initial enrollment, re-enrollment, and the like. Mechanisms are in place to ensure the detection of a deletion, addition, modification, or similar action to an event entry. The event journal is attributable to authenticated sources and may be digitally signed (or otherwise protected) to meet these requirements. The event journal entries 130 can include, for example: enrollment, enrollment failure, re-enrollment, re-enrollment failure, dynamic enrollment, dynamic enrollment failure, termination, addition, deletion, modification, injection, summary, and archive. In some arrangements, because of the tokenization of the information in the event journal log, the event journal log can be signed, time stamped, and stored in an accessible repository, such as a blockchain. The date and time in each event journal record definition indicate when the record was created by the BSP computing system 102. This process is expanded upon further in methods 20 and 30 of FIG. 1 and methods 310 and 320 of FIG. 3.

The biometric reference template database 122 is structured to store the biometric reference templates and corresponding user identifiers for all of the users enrolled in the biometric authentication service with the BSP. The biometric reference template database 122 can update or replace an existing biometric reference record with a new biometric reference record when the user provides an additional biometric sample. The biometric reference template database 122 provides a specific biometric reference template in response to a verification request for a user identifier, which may be analyzed to determine whether a specific biometric sample matches the specific biometric reference template.

The tokenized biometric sample database 124 is structured to store the tokenized biometric samples used for re-enrollment and dynamic enrollment events. According to various embodiments, the tokenized biometric sample database may include any of various types of databases, distributed ledgers, blockchains, cloud storage systems, etc. The tokenized biometric sample database 124 provides a specific tokenized biometric sample in response to a re-enrollment request, a dynamic enrollment request, or an audit of an event journal entry.

In some arrangements, the BSP computing system 102 includes a raw biometric sample database (not shown) structured to store, off of the network 112, the raw, detokenized biometric data for all users stored in the BSP computing system 102. The raw biometric data is stored so that it can be reprocessed using a new processing method if the need arises. For example, a specific first algorithm is used to tokenize and process all of the raw biometric data. However, a second algorithm may be developed and preferred over the first method. The raw biometric data in the raw biometric sample database is processed using the new second processing algorithm, and the corresponding biometric reference templates are replaced in the database with the new tokenized templates. For security purposes, the raw biometric sample database can be stored off-network and only accessed to add new raw biometric data to the database or to reprocess the raw data using a new algorithm, thereby preventing access through an outside attack.

The event journal repository 106 stores the event journal entries 130 generated by the event journal entry circuit 120 of the BSP computing system 102 or other authorized publishing user, such as the third party computing system 110. In some arrangements, the event journal repository 106 is stored in a blockchain that allows auditing by authorized entities while still being restricted through use of a private blockchain or using cryptography in a shared blockchain.

The TSP computing system 108 includes a network interface circuit 132, a tokenization circuit 134, and a token vault 136. The TSP computing system 108 may, for example, include one or more servers each with one or more processors configured to execute instructions stored in a memory, send and receive data stored in the memory, and perform other operations to implement the financial services associated with the processing modules, databases, and processes described herein. In some embodiments, some or all of the TSP computing system 108 is managed by the BSP computing system 102.

The network interface circuit 132 is structured to facilitate operative communication between the TSP computing system 108 and other systems and devices over the network 112.

The tokenization circuit 134 is structured to organize and facilitate the tokenization (e.g., obfuscating the cleartext with a token) of any biometric sample data received. This includes tokenizing and detokenizing the tokenized biometric samples or the biometric reference templates of the BSP computing system 102 or the third party computing system 110. In some arrangements, the tokenization circuit 134 may provide an OID with the tokenized biometric data to the BSP computing system 102 for inclusion in a biometric reference template or tokenized biometric sample. For example, the OID could represent a TSP identifier, tokenization schema, or other information to assist the TSP computing system 108 in processing a tokenization request from the BSP computing system 102. In some arrangements, the BSP computing system 102 may transmit a detokenization request with the tokenized biometric sample to the TSP computing system 108. In other arrangements, the BSP computing system 102 may transmit a detokenization request with the tokenized biometric sample to the TSP computing system 108. In some arrangements, the tokenization circuit 134 may examine an OID (e.g., either as a signed attribute or included in the template) with the tokenized biometric sample from the BSP computing system 102.

In one embodiment, the tokenization circuit 134 is structured to generate a token recovery service attribute, which can be included in a tokenized biometric sample (or the biometric reference template in some arrangements) to specify the parameters for recovering plaintext biometric data. In one embodiment, a token recovery service attribute is represented by a tokenRecoveryService information object of class ATTRIBUTE and is defined as:

tokenRecoveryService ATTRIBUTE ::={
      WITH SYNTAX URI
      ID id-tokenRecoveryService
    }

In an embodiment, the token recovery service attribute includes a Uniform Resource Identifier ("URI") query string that can be used to recover the plaintext data from a token using a TSP. The URI may be in the form of a URL that both identifies and locates the TSP resource capable of recovering plaintext from a given token. The attribute may support both Hypertext Transfer Protocol ("HTTP") and HTTP over Secure Sockets Layer ("HTTPS").

In an embodiment, the general syntax of the query string is:

?token1=value1&account2=userID2&authenticator3=
      password3 . . .

The information in this attribute uses the value of the token component of a biometric reference template (or in some embodiments the reference template), and an account value registered by the TSP that uniquely identifies the user requesting detokenization of the token value, and the authenticator password or other secret shared by the user and the TSP that is needed to authenticate the access of that user to the detokenized token value database 122 that contains the tokenized biometric sample.

In an embodiment, the token component is a value of type Token, defined as:

Token ::=OCTET STRING (SIZE (16))

A value of type userID is any type of user account identifier, and a value of password can be any string of octets—which may or may not contain structured data—needed to authenticate the user requesting access to the detokenized token.

A value of type Token can be used to uniquely determine the address or location of any tokenized value controlled by the TSP.

The token vault 136 is structured to store tokenized data and the tokenization schemas that the TSP has implemented to tokenize data. In some arrangements, the token vault 136 includes the plaintext data associated with the generated token.

The third party computing system 110 includes a network interface 140 and a request circuit 142. The network interface 140 is structured to facilitate operative communication between the audit computing systems 108 and other systems and devices over the network 112. In some arrangements, the third party computing system 110 is authorized to publish to the event journal repository 106 and may contain an event journal entry circuit.

The request circuit 142 is structured to request one or more tokenized biometric samples to complete a dynamic enrollment event. The request circuit 142 receives a user identifier or user authenticator and transmits the user-provided authenticator or identifier to the authorization circuit 118 of the BSP computing system 102. In some arrangements, the third party computing system 110 is a subscriber to the dynamic biometric enrollment system 100, thereby allowing the third party computing system 110 to retrieve a tokenized biometric enrollment sample in the database 124 by providing a user identifier because the third party has been previously vetted. The dynamic enrollment process is explained in greater detail below in reference to method 320 of FIG. 3.

Figure 3:
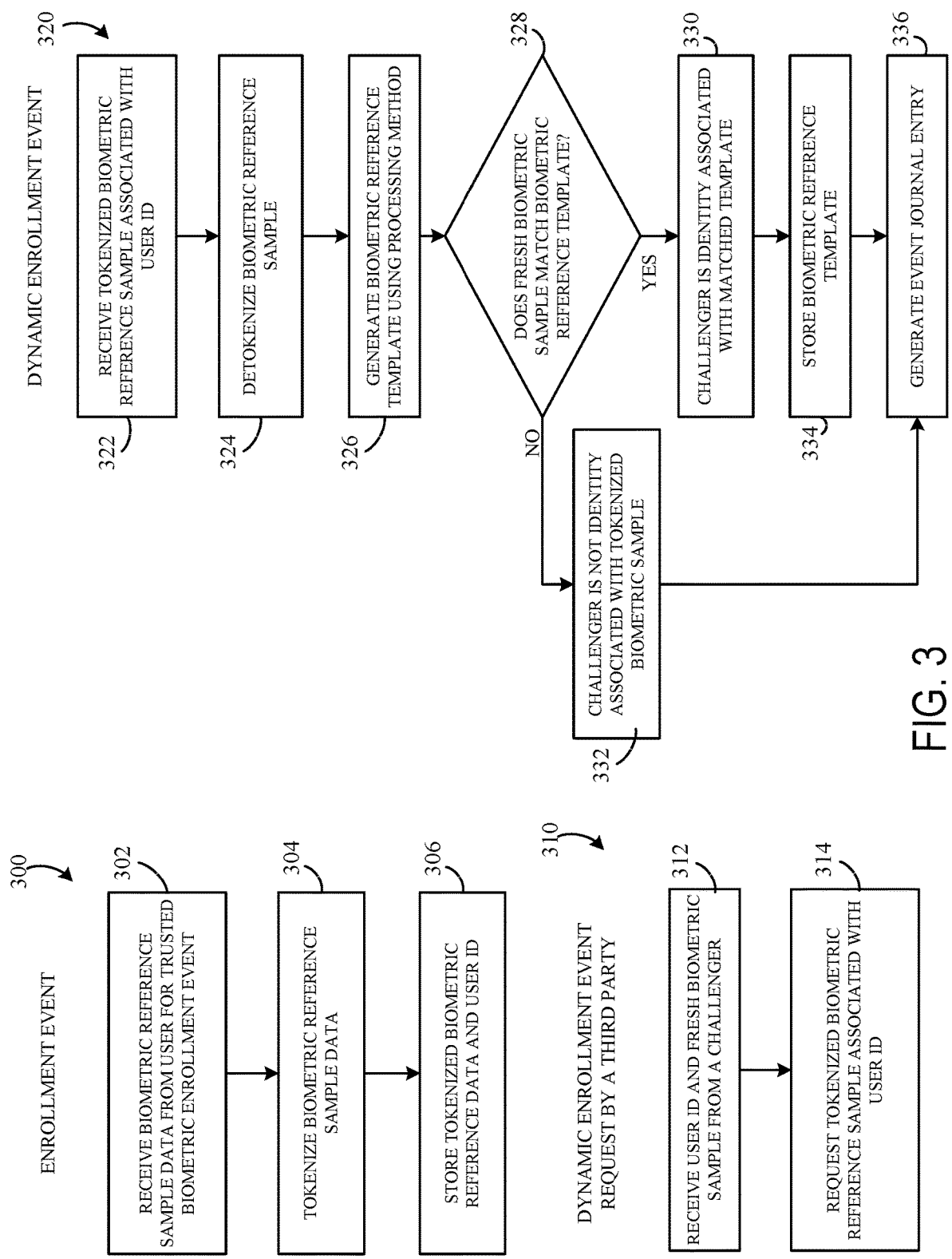
FIG. 3 is a flow diagram of a dynamic enrollment method a biometric reference template, according to an example embodiment.

Referring to FIG. 3, a flow diagram of a dynamic enrollment method 320 is shown, according to an example embodiment. The dynamic enrollment method 320 is shown in connection with a dynamic biometric enrollment system facilitating a dynamic enrollment for a third party. The method 320 includes a method 300 of capturing a user's initial biometric enrollment samples by the dynamic biometric enrollment system and a method 310 of a third-party requesting a dynamic enrollment event. As will be appreciated, the method 310 can be performed by an external third party, such as an entity that manages the third party computing system 110 of FIG. 2. Additionally, the method 320 may be similarly performed by other systems and devices.

Generally, the dynamic enrollment method 320 allows for any entity to generate a biometric reference template for a user without having to collect biometric samples from a user or performing initial vetting. The dynamic enrollment involves a user having at least one biometric sample from at least one biometric technology captured. The raw biometric sample(s) are tokenized and stored in the dynamic biometric enrollment system database for future transfer. The user is then able to have the tokenized biometric samples subsequently retrieved and provided to a third party entity that can use the biometric samples to generate an entity-specific biometric reference template. The biometric enrollment tokens are detokenized and a new biometric reference template is generated. As will be appreciated, this allows the entity to use entity-specific processing algorithms or matching algorithms to make use of the tokenized biometric reference templates. The dynamic enrollment can be captured in an event journal along with the biometric enrollment tokens, the old biometric reference template, and the new biometric reference template. Only the biometric tokens or identifiers are included in the event log; no biometric data (e.g., samples, reference templates) are captured in the event log.

The initial enrollment method 300 begins at 302 with receiving a biometric reference enrollment sample and a user identifier. The user identifier is associated with the user enrolling in the dynamic enrollment services. The enrollment process may include checking the identification credentials (e.g., state issued driver's license, birth certificate, etc.) of the user to confirm the user's identity. The biometric enrollment sample may include one or more samples from a plurality of biometric technologies (e.g., iris, voice, fingerprint, etc.). As will be appreciated, multiple raw biometric enrollment samples may be captured during initial enrollment allowing for future processing using any processing algorithm and any biometric technology. The entity operating the dynamic biometric enrollment system is trusted by any subsequent entity using the dynamic biometric enrollment system to have properly and thoroughly vetted the identity of the user.

At 304, the BSP providing the dynamic enrollment tokenizes the biometric enrollment sample data. This may include transferring the data to a TSP with a tokenization request. The TSP tokenizes the biometric data and transmits the tokenized biometric data to the dynamic enrollment entity. In some arrangements, a TST may be retrieved from a TSA and associated with the tokenized biometric enrollment sample. The TST provides a reliable and verifiable time indicative of when the sample was taken or tokenized.

The tokenized biometric reference data is stored in a database and associated with the user identity at 306. In some arrangements, the BSP provides a URI query string that can be used to recover the tokenized biometric reference data for the user. The URI may be in the form of a URL that both identifies and locates the BSP (or TSP) capable of providing the biometric enrollment sample tokens.

The dynamic enrollment request method 310 begins when a third party entity receives a fresh biometric sample and user identifier from a user attempting to be authenticated at 312. The user does not have a biometric reference template in the database and thus requires tokenized biometric enrollment samples from the BSP.

At 314, the third party entity requests the tokenized biometric enrollment samples from the BSP. This may include providing the user identifier and a user authenticator—generated at the time of the initial enrollment method 300—that indicates to the BSP that the requesting third party has the user's permission. In other arrangements, the third party entity is a subscriber to the BSP. As a subscriber, the third party entity is able to request and receive the tokenized biometric enrollment samples from the BSP using a subscriber authenticator.

The dynamic enrollment method 320 begins when the third party entity receives a tokenized biometric enrollment sample for the user identifier at 322. In some arrangements, an initial enrollment event journal entry is retrieved and then the biometric enrollment tokens are retrieved from the entry. In those arrangements, the retrieval includes accessing the initial enrollment event journal entry in a block within a blockchain. In some arrangements, the retrieval includes verifying the digital signature of the digitally signed enrollment event journal entry.

At 324, the biometric enrollment token is detokenized. This may include transferring the data to a TSP with a detokenization request. The TSP detokenizes the biometric data and transmits the plaintext biometric data to the third party entity. In arrangements where the biometric reference template is included in the enrollment event journal entry, the biometric reference template is also detokenized.

At 326, the third party entity processes the provided biometric enrollment sample using the third party's processing algorithm to generate a dynamic biometric reference template. In some arrangements, the third party entity may facilitate the tokenization of the biometric reference template.

At 328, it is determined whether the fresh biometric sample captured at 312 matches the dynamic biometric reference template. This process is specific to the matching algorithm implemented by the third party entity. For example, this process can include using the fresh biometric sample to generate (using the same processing techniques) a temporary biometric reference template to match with the dynamic biometric reference template. If the fresh biometric sample matches the dynamic biometric reference template, then the dynamic enrollment process may continue at 330. If the fresh biometric sample does not match the dynamic biometric reference template, then the dynamic enrollment entry fails at 332.

At 330, the challenger's identity is authenticated as the identity of the user that initially enrolled the biometric enrollment samples with the BSP at 302. At 334, the dynamic biometric reference template is associated with the user identifier that uniquely identifies the challenger/user.

At 336, a dynamic enrollment event journal entry is generated in a response to generation of the dynamic biometric reference template. The dynamic enrollment event journal entry can include one or more of: the tokenized biometric enrollment data, a dynamic biometric reference template identifier, and the tokenized fresh biometric sample. The dynamic enrollment event journal entry is stored in a repository (e.g., database, blockchain, distributed ledger, etc.). In some arrangements, a dynamic biometric template token (e.g., tokenized dynamic biometric reference template) is included in the event log in lieu of the dynamic biometric reference template identifier. In some embodiments, the third party entity digitally signs (e.g., cryptographically binds) the dynamic enrollment event journal entry containing the tokenized biometric enrollment data, the dynamic biometric reference template identifier, and the tokenized fresh biometric sample. In other embodiments, the third party entity digitally signs the tokenized biometric enrollment data, the dynamic biometric reference template identifier, the tokenized fresh biometric sample, and additional identifiers to generate the dynamic enrollment event journal entry. In some arrangements, the digital signing is performed using SignedData cryptographic message syntax to generate a SignedData message, binding additional identifiers (e.g., OIDs) and other information to the verification event journal entry to create a signed message. Some embodiments utilize an OID as specified in the ISO/IEC 9834-1 standard. In some embodiments, the SignedData is the cryptographic message defined in the X9.73 financial industry security standard. After performing the SignedData signature verification, an auditing entity can verify the tokenized biometric enrollment data, the dynamic biometric reference template identifier, and the tokenized fresh biometric sample contained within the entry. The information needed for token processing can be contained in an attribute of the SignedData message that may be cryptographically bound to the verification event journal entry being signed under the same digital signature. In some arrangements, the result of the failed dynamic enrollment at 332 can trigger the generation of a dynamic enrollment event journal entry to be stored in the event journal or similar repository.

In some arrangements, the dynamic enrollment method 320 can be used to track the authenticity activity of a user by generating a URI and associating it with the at least one biometric authentication sample captured with the event. For example, if the at least one biometric authentication sample is captured during a purchase with a user's credit card, the URI could contain the credit card and purchase information. In response to the generated URI, an authentication activity event journal entry can be generated. The authentication activity event journal entry can include the URI and the event and be associated with the dynamic enrollment event journal entry. At a future time, an entity can examine the authentication activity of the user.

The embodiments described herein have been described with reference to drawings. The drawings illustrate certain details of specific embodiments that implement the systems and methods described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be remote processors (e.g., a cloud based processor). Alternatively or additionally, the one or more processors may be internal and/or local to the apparatus. In this regard, a given circuit, or components thereof, may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that, although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed:

1. A dynamic biometric enrollment system comprising a processor and instructions stored in non-transitory machine-readable media, the instructions configured to cause a server system to:

receive at least one tokenized biometric enrollment sample, the at least one tokenized biometric enrollment sample having been generated by tokenizing at least one biometric enrollment sample captured from a user associated with a unique user identifier;

receive at least one biometric authentication sample captured from the user;

detokenize the at least one tokenized biometric enrollment sample to retrieve the at least one biometric enrollment sample;

process at least one biometric enrollment sample using a biometric processing algorithm to generate a dynamic biometric reference template;

determine whether the at least one biometric authentication sample matches with the dynamic biometric reference template;

generate a verification match value indicative of whether the at least one biometric authentication sample matches with the dynamic biometric reference template, wherein a positive verification match value indicates that an identity of the user is verified;

generate a dynamic enrollment event journal entry, the dynamic enrollment event journal entry comprising:

the user identifier;

the verification match value;

a dynamic biometric reference template identifier uniquely identifying the dynamic biometric reference template; and the at least one tokenized biometric enrollment sample, wherein the verification match value provides assurance that the at least one biometric enrollment sample used to generate the dynamic biometric reference template was originally captured from the user associated with the user identifier;

digitally sign the dynamic enrollment event journal entry using SignedData cryptographic message syntax to generate a SignedData message; and bind the second identifier to the SignedData message via an attribute of the SignedData message.

2. The system of claim 1, wherein the instructions are further configured to cause the server system to:

digitally sign the dynamic enrollment event journal entry with a private key, wherein origin authenticity and data integrity of the dynamic enrollment event journal entry can be determined based on each of the digitally signed dynamic enrollment event journal entry and a public key of a public/private key pair including the private key.

3. The system of claim 1, wherein the instructions are further configured to cause the server system to:

generate a dynamic biometric reference template identifier, the dynamic biometric reference template identifier uniquely identifying the dynamic biometric reference template generated using the at least one biometric enrollment sample.

4. The system of claim 1, wherein the instructions are further configured to cause the server system to receive a uniform resource locator associated with the at least one tokenized biometric enrollment sample, wherein the at least one tokenized biometric enrollment sample is received from a storage address specified by the uniform resource locator.

5. The system of claim 1, wherein the instructions are further configured to cause the server system to:

store the dynamic biometric reference template if the at least one biometric authentication sample matches with the dynamic biometric reference template, and associate the dynamic biometric reference template with the user identifier.

6. The system of claim 1, wherein the at least one tokenized biometric enrollment sample is received from a distributed ledger, wherein the instructions are further configured to cause the server system to receive a pointer to an address on the distributed ledger at which the at least one tokenized biometric enrollment sample is stored, and wherein the at least one tokenized biometric enrollment sample from the user further includes receiving the at least one tokenized biometric enrollment sample from the distributed ledger at the address specified by the pointer.

7. The system of claim 1, wherein the instructions are further configured to cause the server system to:

time stamp the dynamic enrollment event journal entry using a trusted timing authority, wherein the dynamic enrollment event journal entry provides reliability and verifiability of when the dynamic enrollment event journal entry was generated.

8. The system of claim 1, wherein the instructions are further configured to cause the server system to:

receive a uniform resource identifier associated with the at least one biometric authentication sample, wherein the uniform resource identifier is indicative of an event associated with whether the at least one biometric authentication sample matches with the dynamic biometric reference template;

generate an authentication activity event journal entry that comprises the uniform resource identifier and the event; and associate the authentication activity event journal entry with the dynamic enrollment event journal entry.

9. A method, comprising:

receiving, by a computing system, at least one tokenized biometric enrollment sample, the at least one tokenized biometric enrollment sample having been generated by tokenizing at least one biometric enrollment sample captured from a user associated with a unique user identifier;

receiving, by the computing system, at least one biometric authentication sample captured from the user;

detokenizing, by the computing system, the at least one tokenized biometric enrollment sample to retrieve the at least one biometric enrollment sample;

processing, by the computing system, at least one biometric enrollment sample using a biometric processing algorithm to generate a dynamic biometric reference template;

determining, by the computing system, whether the at least one biometric authentication sample matches with the dynamic biometric reference template;

generating, by the computing system, a verification match value indicative of whether the at least one biometric authentication sample matches with the dynamic biometric reference template, wherein a positive verification match value indicates that an identity of the user is verified;

generating, by the computing system, a dynamic enrollment event journal entry, the dynamic enrollment event journal entry comprising:

the user identifier;

the verification match value;

a dynamic biometric reference template identifier uniquely identifying the dynamic biometric reference template; and the at least one tokenized biometric enrollment sample, wherein the verification match value provides assurance that the at least one biometric enrollment sample used to generate the dynamic biometric reference template was originally captured from the user associated with the user identifier;

digitally signing, by the computing system, the dynamic enrollment event journal entry using SignedData cryptographic message syntax to generate a SignedData message; and binding, by the computing system, the second identifier to the SignedData message via an attribute of the SignedData message.

10. The method of claim 9, further comprising:

digitally signing, by the computing system, the dynamic enrollment event journal entry with a private key, wherein origin authenticity and data integrity of the dynamic enrollment event journal entry can be determined based on each of the digitally signed dynamic enrollment event journal entry and a public key of a public/private key pair including the private key.

11. The method of claim 9, further comprising:

generating, by the computing system, a dynamic biometric reference template identifier, the dynamic biometric reference template identifier uniquely identifying the dynamic biometric reference template generated using the at least one biometric enrollment sample.

12. The method of claim 9, further comprising receiving, by the computing system, a uniform resource locator associated with the at least one tokenized biometric enrollment sample, wherein the at least one tokenized biometric enrollment sample is received from a storage address specified by the uniform resource locator.

13. The method of claim 9, further comprising:
storing, by the computing system, the dynamic biometric reference template if the at least one biometric authentication sample matches with the dynamic biometric reference template, and
associating, by the computing system, the dynamic biometric reference template with the user identifier.

14. The method of claim 9, wherein the at least one tokenized biometric enrollment sample is received from a distributed ledger,
wherein the method further comprises receiving, by the computing system, a pointer to an address on the distributed ledger at which the at least one tokenized biometric enrollment sample is stored, and
wherein the at least one tokenized biometric enrollment sample from the user further includes receiving the at least one tokenized biometric enrollment sample from the distributed ledger at the address specified by the pointer.

15. The method of claim 9, further comprising:
time stamping, by the computing system, the dynamic enrollment event journal entry using a trusted timing authority, wherein the dynamic enrollment event journal entry provides reliability and verifiability of when the dynamic enrollment event journal entry was generated.

16. The method of claim 9, further comprising:
receiving, by the computing system, a uniform resource identifier associated with the at least one biometric authentication sample, wherein the uniform resource identifier is indicative of an event associated with whether the at least one biometric authentication sample matches with the dynamic biometric reference template;
generating, by the computing system, an authentication activity event journal entry that comprises the uniform resource identifier and the event; and
associating, by the computing system, the authentication activity event journal entry with the dynamic enrollment event journal entry.

17. A non-transitory computer readable media having computer-executable instructions embodied therein that, when executed by a computing system, causes the computing system to perform operations comprising:
receiving at least one tokenized biometric enrollment sample, the at least one tokenized biometric enrollment sample having been generated by tokenizing at least one biometric enrollment sample captured from a user associated with a unique user identifier;
receiving at least one biometric authentication sample captured from the user;
detokenizing the at least one tokenized biometric enrollment sample to retrieve the at least one biometric enrollment sample;
processing at least one biometric enrollment sample using a biometric processing algorithm to generate a dynamic biometric reference template;
determining whether the at least one biometric authentication sample matches with the dynamic biometric reference template;
generating a verification match value indicative of whether the at least one biometric authentication sample matches with the dynamic biometric reference template, wherein a positive verification match value indicates that an identity of the user is verified;
generating a dynamic enrollment event journal entry, the dynamic enrollment event journal entry comprising:
the user identifier;
the verification match value;
a dynamic biometric reference template identifier uniquely identifying the dynamic biometric reference template; and
the at least one tokenized biometric enrollment sample,
wherein the verification match value provides assurance that the at least one biometric enrollment sample used to generate the dynamic biometric reference template was originally captured from the user associated with the user identifier;
digitally signing the dynamic enrollment event journal entry using SignedData cryptographic message syntax to generate a SignedData message; and
binding the second identifier to the SignedData message via an attribute of the SignedData message.

18. The computer-readable media of claim 17, wherein the operations further comprise:
digitally signing the dynamic enrollment event journal entry with a private key,
wherein origin authenticity and data integrity of the dynamic enrollment event journal entry can be determined based on each of the digitally signed dynamic enrollment event journal entry and a public key of a public/private key pair including the private key.

19. The computer-readable media of claim 17, wherein the operations further comprise:
generating a dynamic biometric reference template identifier, the dynamic biometric reference template identifier uniquely identifying the dynamic biometric reference template generated using the at least one biometric enrollment sample.

20. The computer-readable media of claim 12, wherein the operations further comprise:
receiving a uniform resource locator associated with the at least one tokenized biometric enrollment sample,
wherein the at least one tokenized biometric enrollment sample is received from a storage address specified by the uniform resource locator.

\* \* \* \* \*